No. 895,802. PATENTED AUG. 11, 1908.
A. SCHULTZ.
VEHICLE WHEEL.
APPLICATION FILED DEC. 14, 1907.
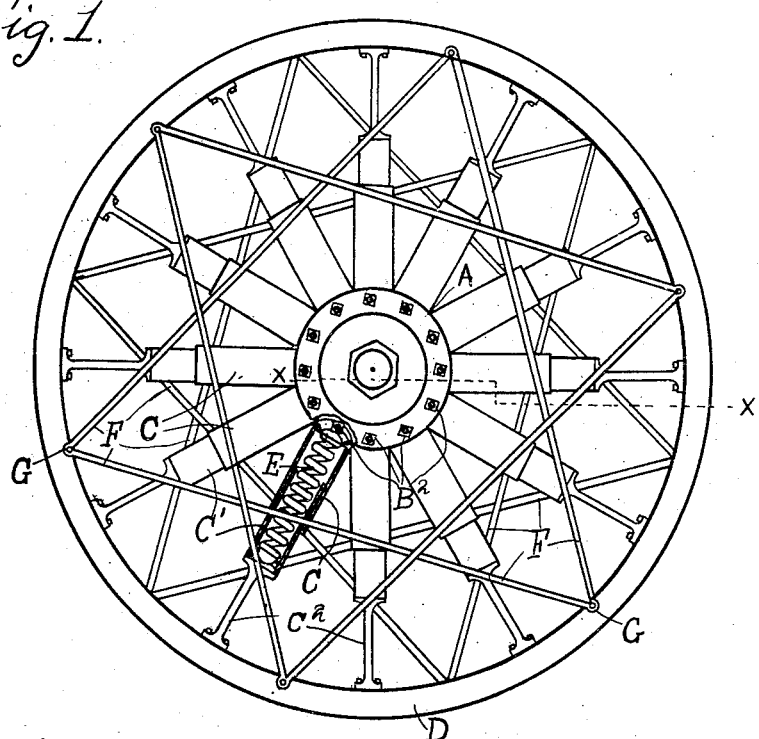
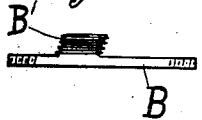
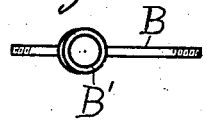
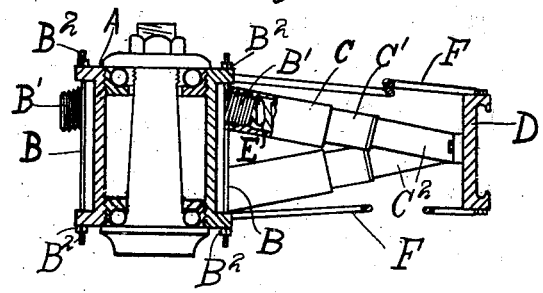
WITNESSES
S. M. Gallagher
E. N. Schofield
INVENTOR
August Schultz
BY
W. Preston Williamson
ATTORNEY

UNITED STATES PATENT OFFICE.

AUGUST SCHULTZ, OF SOUTH BETHLEHEM, PENNSYLVANIA.

VEHICLE-WHEEL.

No. 895,802.　　　　Specification of Letters Patent.　　　Patented Aug. 11, 1908.

Application filed December 14, 1907. Serial No. 406,446.

*To all whom it may concern:*

Be it known that I, AUGUST SCHULTZ, a citizen of the United States, residing at South Bethlehem, county of Northampton, and State of Pennsylvania, have invented a certain new and useful Improvement in Vehicle-Wheels, of which the following is a specification.

My invention relates to a new and useful improvement in vehicle wheels, and has for its object to so construct such a wheel as to produce a spring or cushion action between the rim and the hub thereof whereby the jar and vibration incident to the wheel traveling over a road-bed will be largely absorbed within the wheel instead of being transmitted to the vehicle and the occupants.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of my improved wheel, a portion thereof being in section clearly illustrating the construction of the same. Fig. 2, a section at the line X of Fig. 1. Fig. 3, a side elevation of the connecting member between the hub and the spokes of the wheel, and Fig. 4, a plan view thereof.

In carrying out my invention as here embodied, A represents the hub around which is formed the holes for the reception of the ends of the connecting member B, which acts as a rocker having nuts $B^2$ threaded thereon for holding it in place, the said member B has a threaded portion $B'$ on which is threaded one end of a spoke, the said spoke being made in three parts, the large tubular portion C, the smaller tubular portion $C'$ and the member $C^2$, one end of which is threaded into the smaller tubular portion, the other end of which is fastened to the rim D of the wheel.

The spring E is placed within the tubular portions of the spoke, one end resting against one of the members B, the other end against the member $C^2$, thus regulating the sliding movement of the smaller tubular portion within the larger.

The steel rods F are fastened to the rim of the wheel by means of the screws G so that they form two triangles upon either side of the wheel, these hold the rim together and prevent it from being broken when the wheel strikes a very large obstruction.

From this description it will be seen that a wheel thus made when striking any obstruction while traveling over a road-bed will absorb the greater portion of the jar which would otherwise be transmitted to the vehicle, the effect being to force the tubular portion $C'$ of the lower spokes upward against the action of the spring E, the rockers B permitting the spokes which are on the vertical line to move slightly upward when said obstruction is encountered.

My improved wheel entirely overcomes the many disadvantages which have heretofore attended upon the use of the ordinary wheel for motor vehicles, for when said wheels are fitted with solid rubber tires the shock and vibration transmitted to the body of the vehicle is trying upon the mechanism as well as the occupants, and where pneumatic tires are used constant annoyance and expense is occasioned by puncture and other accidents, and when a pneumatic tire is out of repair the vehicle is seriously crippled, whereas by my improvement the resiliency of the pneumatic tire is provided without the liability of accident from puncture and deflating.

Having thus fully described my invention, what I claim as new and useful, is—

1. In combination, a hub having openings cut therein, a rocker, the ends of which pass through said openings, nuts threaded on the ends thereof for holding the said rocker in position, a tubular portion threaded on said rocker, a second tubular portion smaller than the first adapted to slide therein, a member on one end of which is threaded the second named tubular portion, the other end of which is fastened to the hub of the wheel, springs located within the tubes, and steel rods fastened to the rim, as and for the purpose set forth.

2. The herein described combination of a hub, a rim, spokes connecting said hub and rim, being composed of two tubular portions, a rocker, one of the tubular portions thereof being threaded thereon, a member, on one end of which is threaded the other tubular portion, a spring for forming a cushion between the rim and hub of the wheel, and means for holding the rim in position and preventing it from being broken, as specified.

In testimony whereof, I have hereunto affixed my signature in the presence of two subscribing witnesses.

AUGUST SCHULTZ.

Witnesses:
 JOSEPH A. WALTERS,
 GODFRIED SCHULTZ.